United States Patent
Bosse et al.

(10) Patent No.: US 11,430,087 B2
(45) Date of Patent: *Aug. 30, 2022

(54) USING MAPS COMPRISING COVARIANCES IN MULTI-RESOLUTION VOXELS

(71) Applicant: Zoox, Inc., Foster City, CA (US)

(72) Inventors: Michael Carsten Bosse, Cupertino, CA (US); Patrick Blaes, San Dimas, CA (US); Derek Adams, Santa Clara, CA (US); Brice Rebsamen, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,771

(22) Filed: Dec. 20, 2019

(65) Prior Publication Data

US 2021/0192689 A1    Jun. 24, 2021

(51) Int. Cl.
*G06T 7/73* (2017.01)
*G06T 3/40* (2006.01)
*G06K 9/62* (2022.01)
*G01C 21/30* (2006.01)
*G05D 1/02* (2020.01)

(52) U.S. Cl.
CPC .......... *G06T 3/4084* (2013.01); *G01C 21/30* (2013.01); *G05D 1/021* (2013.01); *G06K 9/6247* (2013.01); *G06T 7/74* (2017.01); *G06T 2207/30252* (2013.01)

(58) Field of Classification Search
None
See application file for complete search history.

(56) References Cited

U.S. PATENT DOCUMENTS

| | | | |
|---|---|---|---|
| 9,600,929 B1* | 3/2017 | Young | G06T 1/60 |
| 2009/0226067 A1* | 9/2009 | Souza | G06T 5/005 |
| | | | 382/131 |
| 2011/0202538 A1* | 8/2011 | Salemann | G06F 16/29 |
| | | | 707/741 |
| 2014/0233804 A1* | 8/2014 | Gustavsson | E21B 47/002 |
| | | | 382/103 |
| 2017/0276473 A1* | 9/2017 | Stewart | G06T 7/75 |

(Continued)

FOREIGN PATENT DOCUMENTS

WO    WO2012/012819 A1    2/2012

OTHER PUBLICATIONS

Bosse et al., "Zebedee: Design of a Spring-Mounted 3-D Range Sensor with Application to Mobile Mapping," IEEE Transactions on Robotics, vol. 28, No. 5, Oct. 2012, 16 pages.

(Continued)

*Primary Examiner* — Steven Z Elbinger
(74) *Attorney, Agent, or Firm* — Lee & Hayes, P.C.

(57) ABSTRACT

Techniques for representing a scene or map based on statistical data of captured environmental data are discussed herein. In some cases, the data (such as covariance data, mean data, or the like) may be stored as a multi-resolution voxel space that includes a plurality of semantic layers. In some instances, individual semantic layers may include multiple voxel grids having differing resolutions. Multiple multi-resolution voxel spaces may be merged to generate combined scenes based on detected voxel covariances at one or more resolutions.

20 Claims, 10 Drawing Sheets

(56) References Cited

U.S. PATENT DOCUMENTS

| | | |
|---|---|---|
| 2019/0049242 A1 | 2/2019 | Adams et al. |
| 2019/0049566 A1 | 2/2019 | Adams et al. |
| 2019/0139403 A1 | 5/2019 | Alam et al. |
| 2019/0156472 A1* | 5/2019 | Link .................... G06T 7/001 |
| 2019/0162856 A1* | 5/2019 | Atalla .................. G01S 17/86 |
| 2019/0179024 A1 | 6/2019 | Englard et al. |
| 2019/0272665 A1 | 9/2019 | X et al. |
| 2020/0271454 A1 | 8/2020 | Kato |
| 2020/0294286 A1* | 9/2020 | Helle ................ G01R 33/5608 |
| 2020/0349341 A1* | 11/2020 | Goel .................. G06K 9/6202 |
| 2020/0388004 A1* | 12/2020 | Zhang ................ G06T 3/0075 |
| 2021/0192840 A1 | 6/2021 | Bosse |

OTHER PUBLICATIONS

Office Action for U.S. Appl. No. 16/722,598, dated Apr. 20, 2021, Bosse, "Maps Comprising Covariances in Multi-Resolution Voxels", 16 pages.

PCT Search Report and Written Opinion dated Mar. 25, 2021 for PCT application No. PCT/US20/70910, 10 pages.

Office Action for U.S. Appl. No. 16/722,598, dated Sep. 22, 2021, Bosse, "Maps Comprising Covariances in Multi-Resolution Voxels", 15 pages.

* cited by examiner

USING MAPS COMPRISING COVARIANCES IN MULTI-RESOLUTION VOXELS

BACKGROUND

Data can be captured in an environment and represented as a map of the environment. Often, such maps can be used by vehicles navigating within the environment, although the maps can be used for a variety of purposes. In some cases, an environment can be represented as a two-dimensional map, while in other cases, the environment can be represented as a three-dimensional map. Further, surfaces within an environment are often represented using a plurality of polygons or triangles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
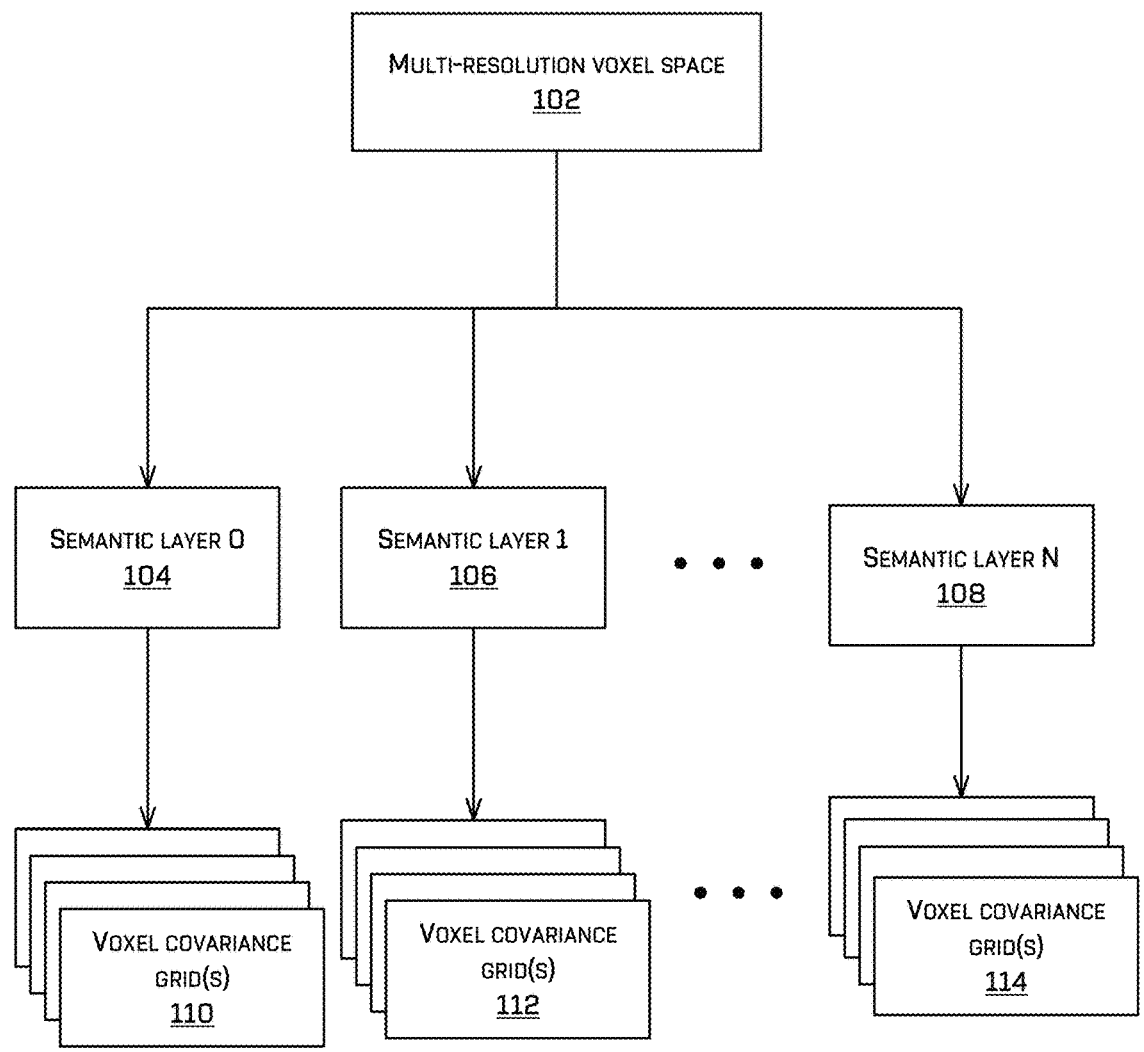
FIG. 1 is an example diagram illustrating an example architecture of a multi-resolution voxel space, as described herein.

Techniques described herein are directed to determining and/or using map data comprising a multi-resolution voxel space comprising voxels storing spatial means, covariances, and weights of point distributions of data representative of a physical environment. The map data may comprise a plurality of voxel grids or layers representing the physical environment at different resolutions or physical distances. For instance, each voxel layer may represent the physical environment at twice the resolution as the proceeding layer. That is, a voxel at a first layer may represent a first volume (e.g., 10 cm×10 cm×10 cm) while a voxel at a second layer may represent a second volume (e.g., 20 cm×20 cm×20 cm). Data associated with voxels of the multi-resolution voxel space may be represented as a plurality of covariance ellipsoids. The covariance ellipsoid representation may be generated based on calculated mean and covariance value of data points associated with individual voxels. In some cases, voxel data can be associated with semantic information such as classification and/or segmentation information, and data associated with a specific classification can be associated with a particular multi-resolution voxel space associated with a specific classification. In this example, each voxel covariance semantic layer may comprise data points associated with a particular semantic class (e.g., tree, vehicle, building, etc.) as covariance ellipsoid.

In some cases, map data represented by a multi-resolution voxel space may be generated from data points representing a physical environment, such as an output of a light detection and ranging (lidar) system. For instance, the system may receive a plurality of lidar points or lidar data represented as a point cloud. The system may assign or otherwise associate the lidar points to voxels of a voxel grid having a first resolution (e.g., the voxel grid of the multi-resolution voxel space having the largest number of voxels) based at least in part on a local reference frame of the vehicle (e.g., the system capturing the lidar points). The system may determine statistical data associated with each voxel, such as a mean, centroid, covariance, and the like of the accumulated data. The system may then merge or otherwise combine voxels (or data associated with the voxels) of a lower resolution grid when generating a higher level voxel grid. For example, voxels (or data associated with the voxels) within a three-dimensional neighborhood in the lower resolution grid (e.g., a number of voxels in the x, y, and z direction that are associated with the physical space of the higher level voxel) may be merged when forming the next higher level voxel grid. In one specific example, the voxels within the neighborhood are merged by taking a weighted sum of the individual Gaussian distributions of each voxel of the lower resolution grid. In some cases, merging voxels at a lower resolution to form the higher resolution grids not only is computationally inexpensive, but also allows the lower resolution grids to assist in localizing the lidar data with a local reference frame.

In some implementations, the system may utilize the multi-resolution voxel space to align multiple scans of a physical environment to generate maps and scenes of the physical environment as well as to assist in localization of the vehicle within the map or scene. For instance, once a multi-resolution voxel space (e.g., a target multi-resolution voxel space), is generated for a particular scan or dataset representative of the physical environment, the system may align the generated multi-resolution voxel space with a multi-resolution voxel space representative of the scene (e.g., a reference multi-resolution voxel space). In some cases, the alignment may be performed by finding correspondences between voxels at each resolution of the reference and target multi-resolution voxel space substantially simultaneously. For example, the system may, for each voxel of a particular resolution in the target multi-resolution voxel space, search among voxels within a threshold distance or within a threshold number of voxels (e.g., a neighborhood of voxels) containing a mean target point in a corresponding particular resolution of the reference multi-resolution voxel space for occupied voxels. In examples including semantic layers, the system may, for each voxel of the particular resolution of each semantic layer in the target multi-resolution voxel space, search the neighborhood of voxels containing the mean target point in the particular resolution of the corresponding semantic layer in the reference multi-resolution voxel space.

Of the voxels identified within the neighborhood of the reference multi-resolution voxel space, the system may select the voxel having a centroid closet to the voxel of the target multi-resolution voxel space. The system may then average the distributions of the selected voxel in the reference multi-resolution voxel space with the voxel of the target covariance stack. Next, the system may perform principal component analysis on the combined covariance matrix and select an eigenvalue (e.g., a smallest eigenvalue) as a matched normal vector for the two voxels. The system may then determine a residual (or error, etc.) for each of the matched voxels which, in at least some examples, may be based at least in part on such matched normal vector, and subsequently perform an optimization over all such residuals. The optimization may minimize a distance between pairs of such voxel centroids. In this manner, a merged voxel representing the two voxels may be located within the grid at a position that accurately represents the covariances (e.g., of the associated data) and weights of both of the original voxels. Of course, merging of such voxels is not necessary in every application. As a non-limiting example, the relative transform between the two voxel spaces may be used, generally, for localization without combining (merging) the voxels.

During alignment, even though each layer may be merged substantially simultaneously, the coarser resolutions (e.g., resolutions corresponding to larger voxels) may result in matches prior to finer resolutions. In this manner, matches in the coarser resolutions may help bring the two multi-resolution voxel spaces into a closer alignment, such that the finer resolutions are able to begin matching and complete the alignment process. In some cases, by merging captured sensor data into a multi-resolution voxel space representative of an environment, the vehicle may be able to initialize a position or localize within the environment with greater accuracy and/or more quickly than systems utilizing traditional map data comprising polygons and/or a mesh. Additionally, by storing the voxels in multi-resolution voxel spaces the data may be stored in a more easily indexable/retrievable manner thereby improving processing speeds and throughput. For example, if a coarse resolution is acceptable for a practical task, the coarse layer may be loaded into memory thereby reducing the amount of data being accessed and processed for the desired operation.

In some cases, the multi-resolution voxel space may more accurately represent the environment than traditional systems, as each layer of the space provides different resolutions of detail about the environment. Thus, in some situations, having access to more detailed representations of the physical environment may improve the overall safely of the autonomous vehicle.

FIG. 1 is an example diagram illustrating an example architecture 100 of a multi-resolution voxel space 102, as described herein. In the current example, the multi-resolution voxel space 102 is formed from a plurality of semantic layers, illustrated as semantic layer 104, 106, and 108. Each of the semantic layers 104-108 may represent data for a particular semantic class or type. For instance, the first semantic layer 104 may include data representative of trees while the second semantic layer 106 may include data representative of buildings. Thus, the multi-resolution voxel space 102 including the plurality of semantic layers 104-108 may represent data from each semantic layer 104-108 as a full picture or map of a physical environment as illustrated below with respect to FIGS. 2-5. In some cases, some applications may require identification or awareness of only particular semantic classes while other applications may require detailed understanding of the whole physical environment. By segmenting the multi-resolution voxel space 102 into semantic layers 104-108, each application may process only the appropriate classes or types of data representative to the environment, thereby improving processing speeds in some applications.

Each of the semantic layers 104-108 may also include one or more voxel grids, illustrated as voxel covariance grids 110, 112, and 114. Each of the voxel covariance grids 110-114 represent the same semantic data of the corresponding semantic layer 104-108 but at different resolutions. For instance, a first voxel covariance grid of the plurality of grids 110 may have voxels with a size of approximately 25 centimeters while a second voxel covariance grid of the plurality of grids 110 have voxels with a size of approximately 16 meters. Thus, each voxel covariance grid of each of the plurality of grids 110-114 may have a different resolution or coarseness to assist with alignment and processing of the data represented of the physical environment. For example, some applications may require only a coarse general understanding of the physical environment while other applications may require a detailed understanding of the physical environment and each application may process the voxel grids at a desired or appropriate resolution, thereby improving processing speeds in some applications.

In some examples, such as those illustrated below with respect to FIGS. 2-5, data associated with the voxels of the voxel covariance grids 110-114 of the multi-resolution voxel space 102 may be represented by voxels storing a covariance matrix, mean, and a weight representative of the point distribution. In some cases, the voxels of the grids 110-114 may be presented visually as covariance ellipsoids. The covariance ellipsoids may be based at least in part on each voxel's eigenvalue ratio shape parameters.

In the illustrated example, three semantic layers 104-108 and three sets of voxel covariance grids 110-114 are shown. However, it should be understood, that the multi-resolution voxel space 102 may include any number of sematic layers and that each semantic layer may include any number of voxel covariance grids. In some implementations, the number of voxel covariance grids for each semantic layer may be the same while, in other implementations, the number of voxel covariance grids within each semantic layer may differ. For instance, some semantic classes such as foliage (or pedestrians) may require more additional fine resolution voxel covariance grids than other semantic classes such as buildings and, thus, the semantic layer representative of the pedestrian class may include more voxel covariance grids than the semantic layer representative of the building class.

Figure 2:
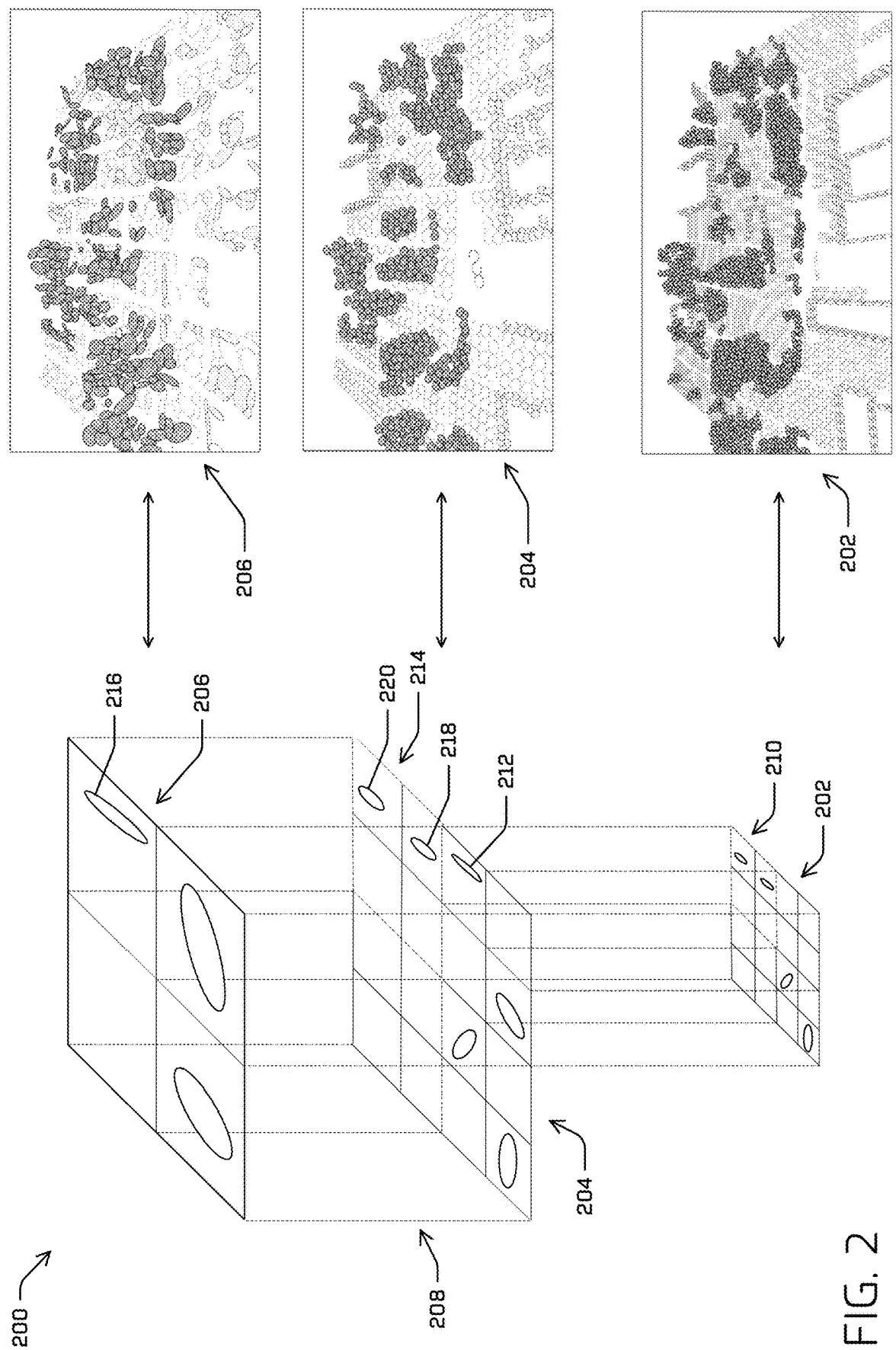
FIG. 2 is an example pictorial diagram illustrating example resolutions of a semantic layer of a multi-resolution voxel space, as described herein.

FIG. 2 is an example pictorial diagram 200 illustrating example resolutions 202, 204, and 206 of a semantic layer of a multi-resolution voxel space 208, as described herein. In the current example, the resolutions are shown in two-dimensions for illustration purposes only and it should be understood that any number of dimensions may be used (such as three-dimensional to represent a real world three-dimensional physical space). In the current example, voxels within a first neighborhood 210 of the first resolution 202 are combined to form the voxel 212 of the second resolution 204. Likewise, voxels within a second neighborhood 214 of the second resolution 204 are combined to form the voxel 216 of the third resolution 206. As discussed below, the voxel 216 of the third resolution may be formed based on a weighted sum of the individual Gaussian distributions from each of the voxels 218 and 220 within the neighborhood 214 to generate a single higher resolution voxel. It should be understood that determining the weighted sum of the individual Gaussian distributions are computationally inexpensive in terms of processing resources and time and, thus, building the multi-resolution voxel space 208 may be performed quicker and with fewer processing resources than traditional systems.

In the current example, two-dimensional 2×2 neighborhoods are shown. However, it should be understood, that the multi-resolution voxel spaces can be formed as three-dimensional voxel grids representative of a physical space and that a neighborhood may have various uniform sizes, such as 2×2×2, 3×3×3, 5×5×5, etc., or non-uniform sizes, such as 2×3×4, 4×3×4, 5×1×3, etc. In one particular example, the neighborhoods may have a 2×2×2 voxel size as each higher resolution layer have half the number of voxels as the proceeding lower layer.

Figure 3:
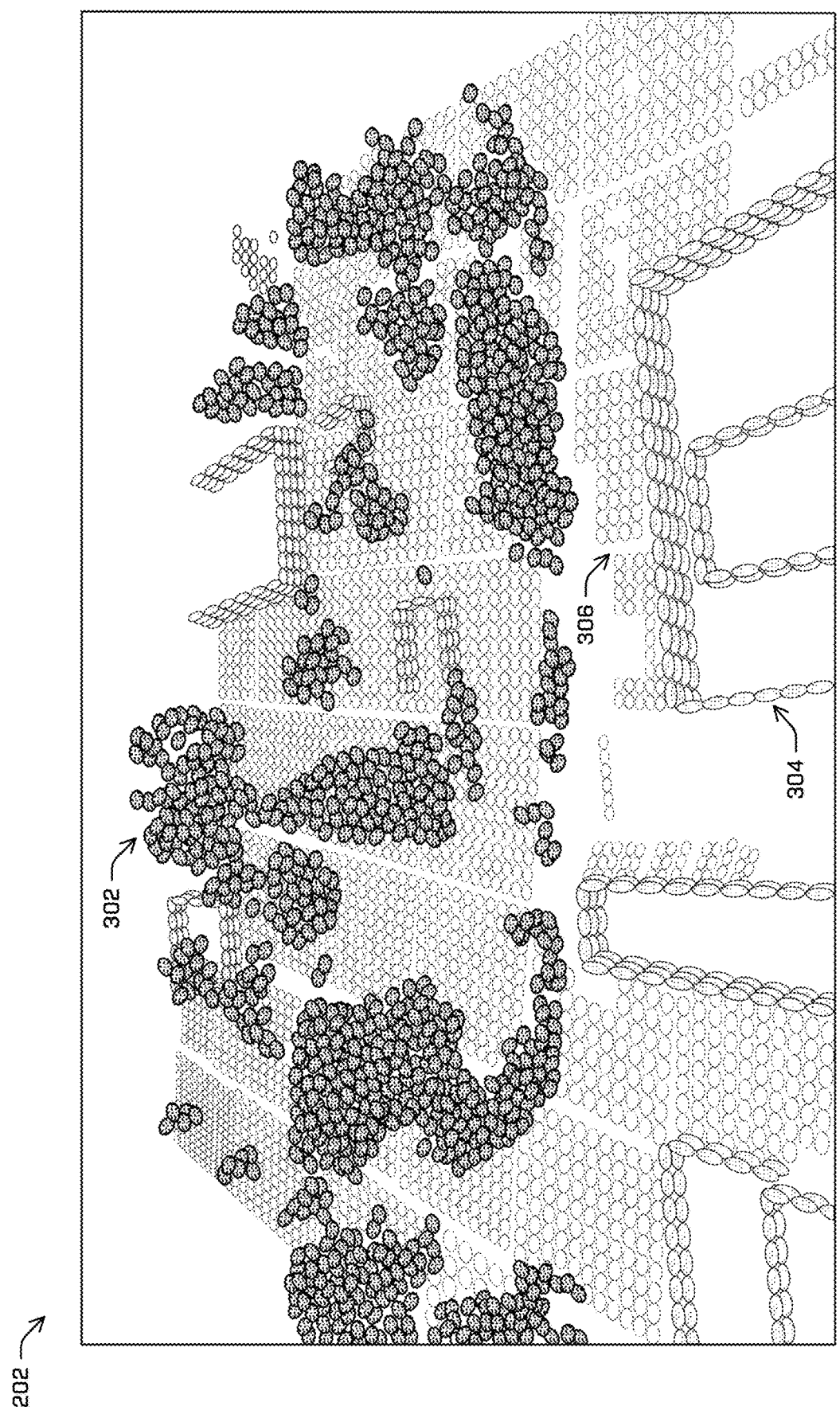
FIG. 3 is an example diagram illustrating a first resolution of the multi-resolution voxel space of FIG. 2, as described herein.
Figure 4:
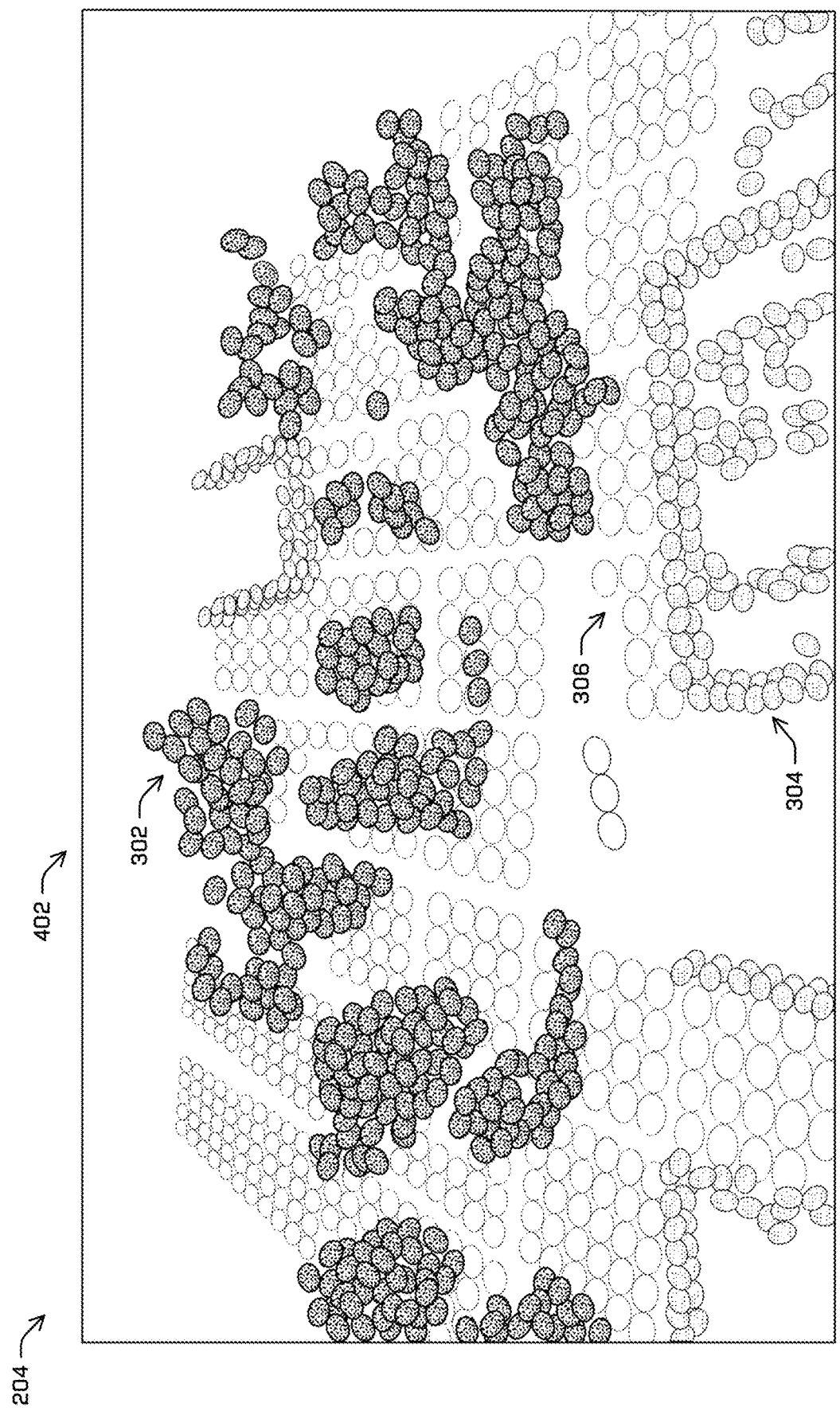
FIG. 4 is an example diagram illustrating a second resolution of the multi-resolution voxel space of FIG. 2, as described herein.
Figure 5:
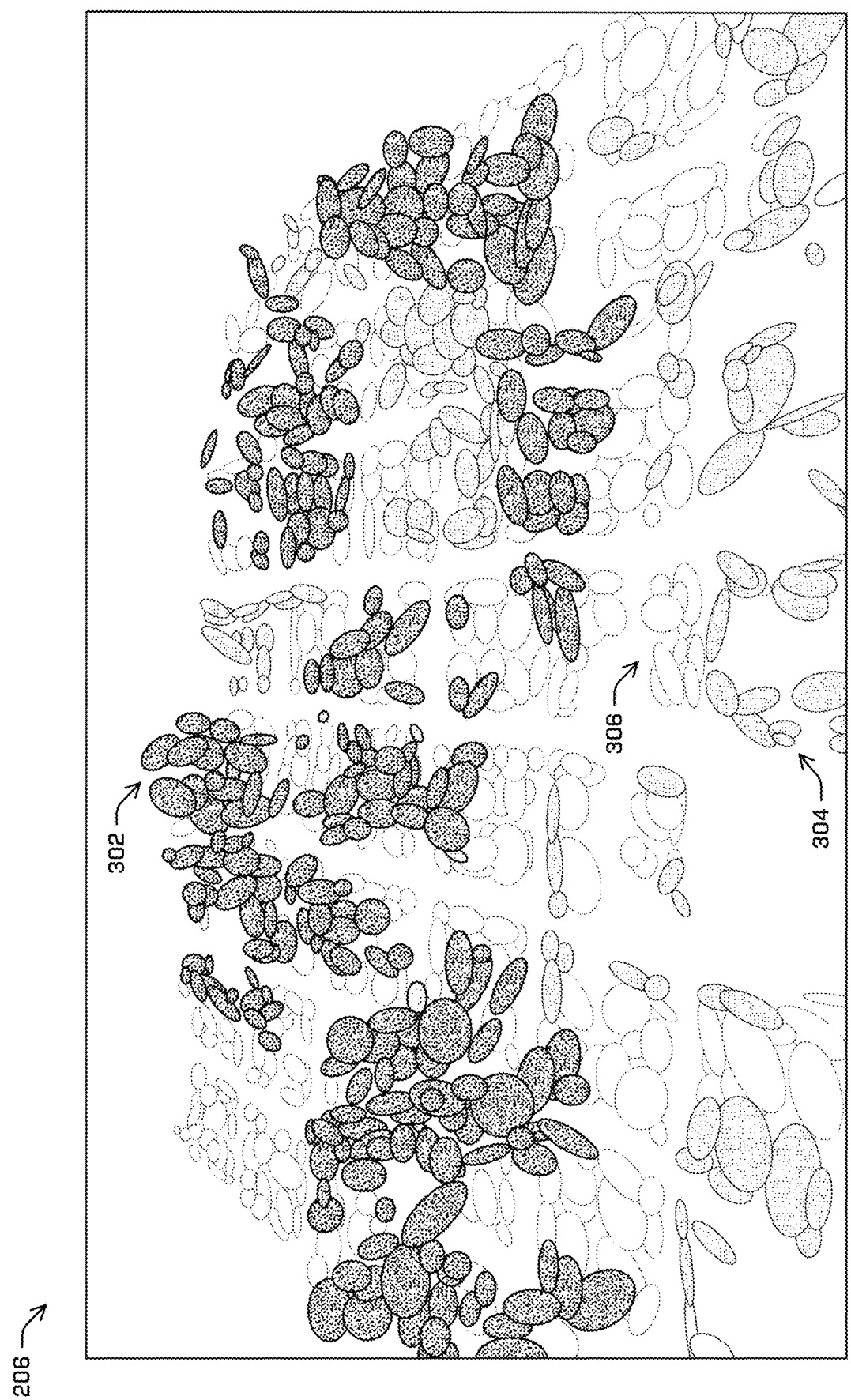
FIG. 5 is an example diagram illustrating a third resolution of the multi-resolution voxel space of FIG. 2, as described herein.

FIGS. 3-5 are example diagrams illustrating multiple resolutions 202, 204, and 206, of the multi-resolution voxel space 208 of FIG. 2, as described herein. In the current example, each of semantic layers of the multi-resolution voxel space 208 is shown to generate a picture or map of a physical environment. For instance, the multi-resolution voxel space 208 may be formed by merging or aligning multiple lidar scans of the physical environment captured by an autonomous vehicle. In the current example, the multi-resolution voxel space 208 may be zoomed in or out to show the physical environment at different resolutions 202, 204, and 206. For instance, the resolution 202 shows voxels at a first or finest resolution. Thus, the resolution 202 of the multi-resolution voxel space 208 includes more voxels than each of the resolutions 204 or 206 and also includes the most detailed representation of the physical environment. Each of the proceeding resolutions 204 or 206 show the physical environment with voxels at succeeding coarser resolutions. For instance, each voxel of the multi-resolution voxel space at the resolution 202 may represent an area of 25 centimeters while each voxel of the multi-resolution voxel space at the resolution 206 may represent an area of 16 meters.

In some cases, the voxels associated with a particular semantic layer may be colored or textured to visually differentiate the voxels associated with two semantic layers from each other when viewing the multi-resolution voxel spaces 208. Further, it should be noted because data associated with each voxel is represented as a covariance ellipsoid with a shape based at least in part on the voxel's eigenvalue ratio, shape parameters and spatial statistics, the data illustrated in FIGS. 2-5 have a shape that is substantially representative of the real-life shape of the corresponding object.

In some examples, each higher resolution 300-500 of the multi-resolution voxel space 102 may have half the number of voxels as the preceding lower level resolution 200-400. For instance, if the resolution 300 has voxels of approximately 4 meters in size, the voxels at resolution 400 may be approximately 8 meters in size (e.g., double the size of the voxels at resolution 300). However, in other examples, the size and/or number of the voxels at each resolution 200-500 may have other mathematical and/or arbitrary relationships.

In the current example, various semantic classes are shown based on the different pattern or colors of the ellipsoids. For instance, the ellipsoids 302 may correspond to foliage, the ellipsoids 304 may correspond to walls, structures, or buildings, and the ellipsoids 306 may correspond ground surface covering, such as grass.

Figure 6:
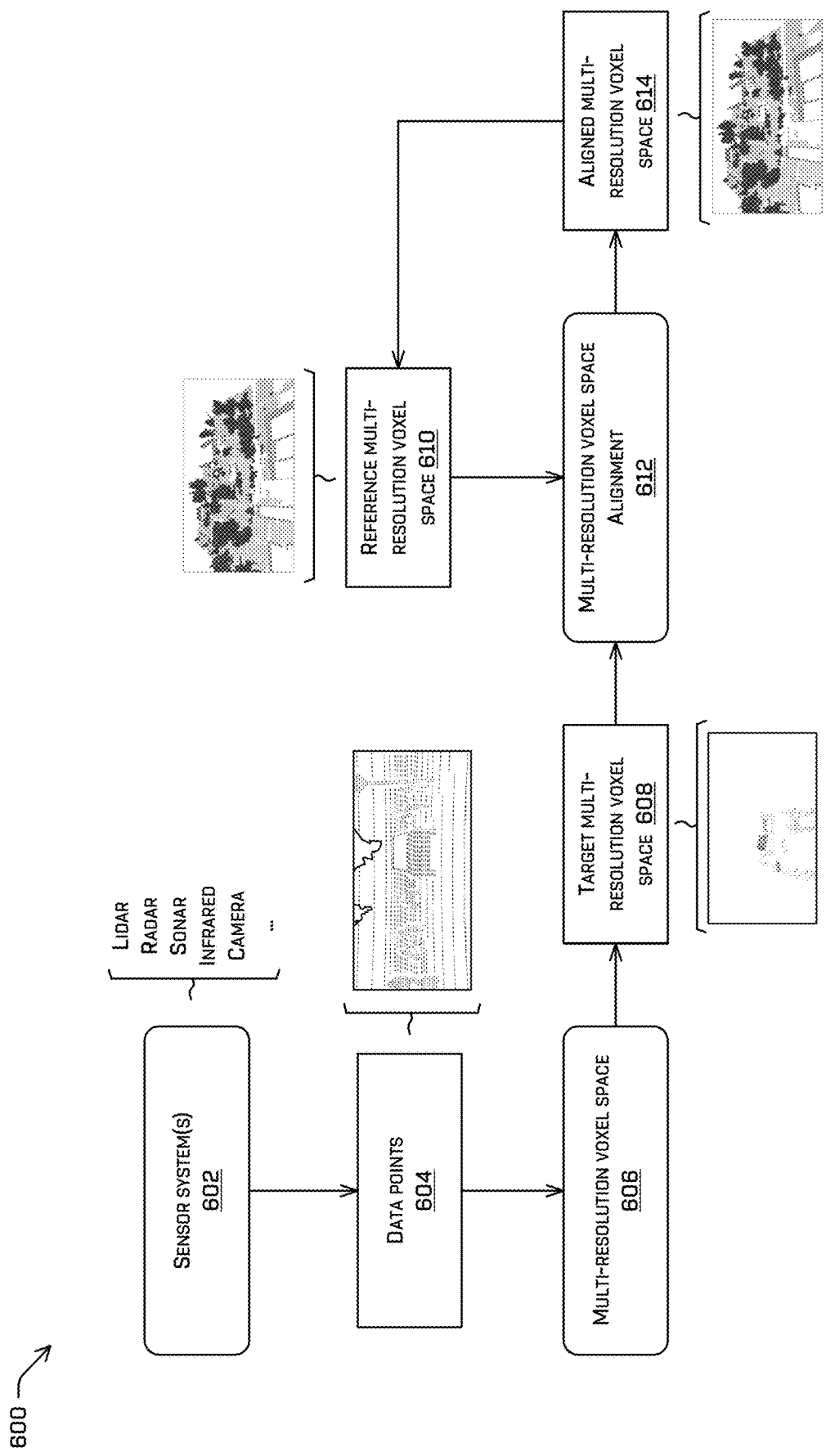
FIG. 6 is an example process flow diagram illustrating an example data flow of a system configured to align data representative of a physical environment with map data, as described herein.
Figure 7:
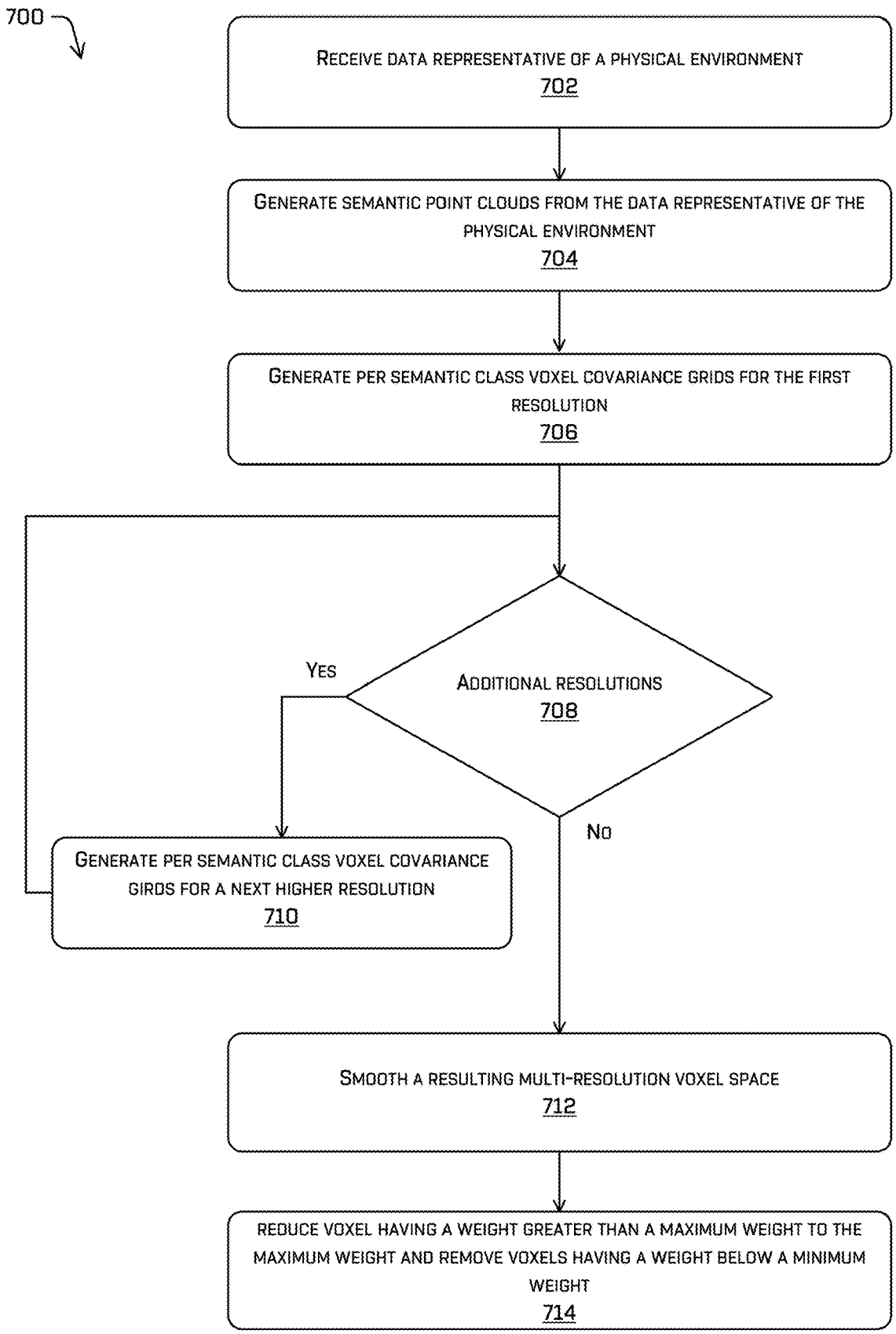
FIG. 7 is an example flow diagram illustrating an example process associated with generating a multi-resolution voxel space, as described herein.
Figure 8:
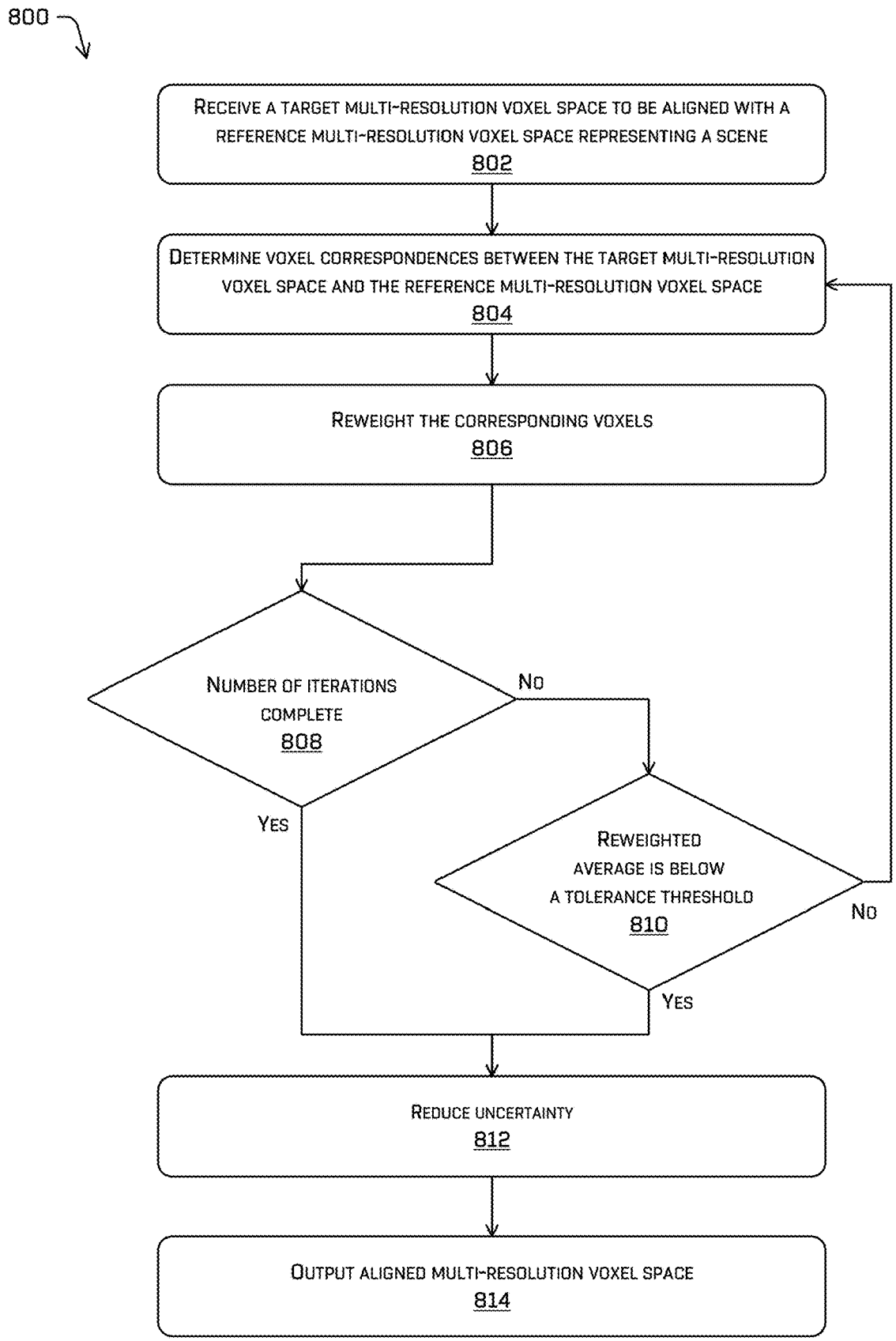
FIG. 8 is another flow diagram illustrating an example process of aligning a target multi-resolution voxel space with a reference multi-resolution voxel space, as described herein.

FIGS. 6-8 are flow diagrams illustrating example processes associated with the multi-resolution voxel space of FIGS. 1-5. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 6 is an example process flow diagram 600 illustrating an example data flow of a system configured to align data representative of a physical environment with a scene, as described herein. In the illustrated example, the system may be configured to store the scene as well as data representative of environment as multi-resolution voxel spaces. As discussed above, the multi-resolution voxel space may have a plurality of semantic layers in which each semantic layer comprises a plurality of voxel grids representing voxels as covariance ellipsoids at different resolutions.

In one particular example, a sensor system 602, such as a lidar, radar, sonar, infrared, camera, or other image capture device, may capture data representative the physical environment surrounding the system. In some cases, the captured data may be a plurality of data points 604, such as a point cloud generated from an output of a lidar scan. In this example, the data points 604 may be received by a multi-resolution voxel space generation component 606.

The multi-resolution voxel space generation component 606 may be configured to produce a target multi-resolution voxel space 608 from the data points 604. In some cases, multi-resolution voxel space generation component 606 may process the data points via a classification and/or segmentation technique. For instance, the multi-resolution voxel space generation component 606 may assign types or classes to the data points using one or more neural networks (e.g., deep neural networks, convolutional neural networks, etc.), regression techniques, among others to identify and categorize the data points 604 with semantic labels. In some cases, the semantic labels may comprise a class or an entity type, such as vehicle, pedestrian, cyclist, animal, building, tree, road surface, curb, sidewalk, unknown, etc. In additional and/or alternative examples, the semantic labels may include one or more characteristics associated with data point 604. For example, characteristics may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, rates of change of the velocity and/or acceleration, an extent of the entity (size), etc.

In some examples, generating the target multi-resolution voxel space 608 may include filtering data associated with dynamic objects (e.g., representing pedestrians, vehicles, etc.) while associating data associated with static objects (e.g., buildings, trees, foliage, etc.) with the target multi-resolution voxel space 608.

In an alternative implementation, the data points 604 may be output by a perception pipeline or component with the semantic labels attached. For instance, the data points 604 may be received as part of a sparse object state representation output by the perception component, details of which are discussed in U.S. application Ser. No. 16/549,694, which is herein incorporated by reference, in its entirety.

In the current example, the multi-resolution voxel space generation component 606 may assign the semantically labeled data points 604 to a semantic layer of the target multi-resolution voxel space 608 having a corresponding semantic label (e.g., tree, building, pedestrian, etc.). For instance, the multi-resolution voxel space generation component 606 may project the data points 604 into a common reference frame and then multiplex the data points 604 within the common reference frame into the appropriate point cloud associated with the corresponding semantic class. For each point cloud, the multi-resolution voxel space generation component 606 may then assign each data point 604 to a voxel of the finest resolution voxel grid (e.g., the base voxel grid) of each semantic layer. In some specific instances, the multi-resolution voxel space may be a single layer that stores multiple statistical values including a semantic class of each of the voxels.

Once each of the data points 604 for the corresponding cloud are assigned to a voxel, the multi-resolution voxel space generation component 606 may compute spatial statistics (e.g., a spatial mean, a covariance, and a weight or number of data points 604 assigned to the voxel) for each voxel of the finest resolution grid of the semantic layer. In one particular example, the spatial statistics of a particular voxel may be computed using Welford's Online Algorithm.

Once the base or finest resolution voxel grid of a semantic layer is completed, the multi-resolution voxel space generation component 606 may iteratively or recursively generate each of the next larger resolution voxel grids of the semantic layer. For instance, the multi-resolution voxel space generation component 606 may utilize the preceding lower resolution grid (staring with the base or finest resolution grid) and merge data associated with voxels within a 2×2×2 neighborhood to form the next higher level voxel grid. In one specific example, the voxels within the neighborhood of the lower resolution voxel grid are merged by taking a weighted sum of the individual Gaussian distributions of each voxel within the neighborhood. Thus, the voxel grids within the semantic layer of the multi-resolution voxel space may form a multiresolution pyramid in which each higher resolution grid includes fewer voxel than the preceding lower resolution grid as discussed in more detail above with respect to FIGS. 1-5. In one specific example, each preceding lower resolution grid of a semantic layer may have four times the number of voxels as the next higher resolution grid.

Once the target multi-resolution voxel space 608 is generated from the data points 604, the target multi-resolution voxel space 608 is aligned with a reference multi-resolution voxel space 610 (e.g., a multi-resolution voxel space representing the scene). For instance, in the illustrated example, a multi-resolution voxel space alignment component 612 may align the newly generated target multi-resolution voxel space 608 with the reference multi-resolution voxel space 610 or to determine a transformation between the target multi-resolution voxel space 608 and reference multi-resolution voxel space 610. To align the target multi-resolution voxel space 608 with the reference multi-resolution voxel space 610, the multi-resolution voxel space alignment component 612 may, substantially simultaneously for each semantic layer and each resolution of the target multi-resolution voxel space 608, take each voxel and determine a mean target point in the corresponding resolution and semantic layer of the reference multi-resolution voxel space 610. The multi-resolution voxel space alignment component 612 may then determine a 2×2×2 neighborhood of the voxel grid at the corresponding resolution and semantic layer of the reference multi-resolution voxel space 610 and identifies if any voxels of the neighborhood are occupied. The multi-resolution voxel space alignment component 612 then selects the voxel having a centroid closest to the voxel from the target multi-resolution voxel space 608 and average the distributions of the selected voxel and the voxel from the target voxel. The multi-resolution voxel space alignment component 612 may then perform principal component analysis on the combined covariance matrix of the selected voxel and the voxel from the target and select a smallest eigenvalue as a matched normal vector for the two voxels, thereby causing the target multi-resolution voxel spaces 608 to more closely align with the reference multi-resolution voxel space 610. In some instances, an optimization may be performed on the matched voxels to improve the overall alignment between the reference and target multi-resolution voxel spaces and/or determine a relative transform (to be used, for example, for localization) including, but not limited to, a non-linear optimization (e.g., a non-linear least squares optimization). As one example, a gradient descent technique, such as the Gauss-Newton technique discussed below may be utilized.

In the Gauss-Newton technique, a match between a first voxel i of the target multi-resolution voxel space 608 and a second voxel j of the reference multi-resolution voxel space 610, the matched residual may be computed as follows:

$$z_{ij} = \frac{n_{ij}^T}{\sqrt{\lambda_0}}(\mu_i - \mu_j)$$

where $n_{ij}^T$ is the matched normal vector, $\mu_i$ is the mean of voxel i, and $\lambda_0$ is the smallest eigenvalue of the match covariance matrix. As alluded to above, the match normal vector is computed from the minimum eigenvector of the weighted sum of the corresponding voxel covariance matrices. The weight of each residual, $z_{ij}$, is reweighted according to an M-estimator framework (e.g. using a Cauchy loss function). Next, a Jacobian of match error ij with respect to the transform between the reference and target grids, $x=[R\ p]^T \in SE(3)$, is given by:

$$J_{ij} = [Rn_{ij} \times \mu_j \times Rn_{ij}]^T$$

Next, the multi-resolution voxel space alignment component 612 may, for each match ij, compute the total gradient and approximate Hessian as follows:

$$g = \sum_{ij} w_{ij} J_{ij} z_{ij}$$

$$H = \sum_{ij} w_{ij} J_{ij} J_{ij}^T$$

and a Gauss-Newton optimization is computed as follows:

$$H\delta T = -g$$

The multi-resolution voxel space alignment component 612 may also compute the delta transform by modeling as an element of a $SO(3) \times R^3$, so that the updated alignment transform is given by:

$$x^{n+1} = [\exp(\delta R)R^n \delta p + p^n]^T$$

where exp( ) is the SO(3) exponential map. It should be understood that the transform given above may be applied to the entire multi-resolution voxel space in further iterations of the optimization and the final iteration may comprise the transform between the two voxel spaces.

The alignment process may continue to iterate after each adjustment of the target multi-resolution voxel space 608 until the two multi-resolution voxel spaces 608 and 610 are aligned within a tolerance or threshold or a predetermined number of iterations (e.g., voxel mergers) are complete. In this manner during alignment, the coarser resolutions (e.g., resolutions corresponding to larger voxels) may result in matches prior to finer resolutions bringing the two multi-resolution voxel spaces 608 and 610 into a closer alignment, such that the finer resolutions are able to begin matching and complete the alignment process past the tolerance or threshold. However, in some implementations, the operations may be performed across all layers and/or semantic classes substantially simultaneously, with a single data transformation determined to align some or all of the various voxel spaces.

In one particular example, the multi-resolution voxel space alignment component 612 may only utilize the highest or coarsest resolutions of each semantic layer in the first iteration in order to initialize the alignment prior to additional iterations. In some cases, each additional iteration may introduce another finer resolution to the alignment process. The fully aligned multi-resolution voxel space 614 may then be output by the multi-resolution voxel space alignment component 612 and used as the next reference multi-resolution voxel space 610.

FIG. 7 is an example flow diagram illustrating an example process 700 associated with construction of a multi-resolution voxel space, as described herein. As discussed above, a multi-resolution voxel space may comprise a plurality of voxel grids or layers representing the physical environment at different resolutions or physical distances. For instance, each voxel layer may represent the physical environment at twice the resolution as the proceeding layer (e.g., 1 foot, 2 feet, 4 feet, etc.). In some cases, the multi-resolution voxel space may be separated into a plurality of semantic layers, each semantic layer including a plurality of voxel grids at different resolutions.

At 702, a multi-resolution voxel space generation component may receive data representative of a physical environment. For example, the multi-resolution voxel space may be generated from data points representing a physical environment, such as the output of lidar system. In other examples, the data may include the output of a radar, sonar, infrared, camera, or other image/data capture device. In some examples, the multi-resolution voxel space generation component may assign a semantic class to each data point. For instance, in one specific example, assignment of semantic classes to data points is discussed in U.S. application Ser. No. 15/820,245, which is herein incorporated by reference, in its entirety.

At 704, the multi-resolution voxel space generation component generates semantic point clouds from the data representative of the physical environment. For example, the multi-resolution voxel space generation component may project data points from the data representative of the physical environment into a common frame.

For instance, the multi-resolution voxel space generation component or another component may apply classification and/or segmentation techniques to the data points to assign a semantic class. In some examples, one or more neural networks (e.g., deep neural networks, convolutional neural networks, etc.), regression techniques, etc. may be used to identify and categorize the data points with semantic classes. In some cases, the semantic classes may comprise a class or an entity type, such as vehicle, pedestrian, cyclist, animal, building, tree, road surface, curb, sidewalk, unknown, etc.

At 706, the multi-resolution voxel space generation component may generate per semantic class voxel covariance grids for the first resolution of the multi-resolution voxel space. In some examples, the multi-resolution voxel space generation component may assign the data points to a corresponding voxel in the matching semantic layer of the multi-resolution voxel space to generate each of the first resolution grids. Once, the data points are assigned to a voxel of a semantic layer, the multi-resolution voxel space generation component may determine voxel spatial statistics, such as a mean and covariance for each voxel. In some cases, the multi-resolution voxel space generation component may begin with a finest resolution layer and then generate each next coarser layer when forming the multi-resolution voxel space.

At 708, the multi-resolution voxel space generation component determines if there are additional resolutions to generate. For example, the multi-resolution voxel space generation component may determine if a resolution is greater than a resolution threshold and/or if a layer count is greater than a layer threshold. If there are additional resolutions, the process 700 advances to 710. However, if there are no additional resolutions to generate, the process 700 proceeds to 712.

At 710, the multi-resolution voxel space generation component may generate the per semantic class voxel covariance grids for a next higher resolution. Each next higher resolution grid may be formed based at least in part on the lower resolution grid by merging voxels of the lower grid. For instance, the multi-resolution voxel space generation component may take a neighborhood (such as a 2×2×2 group) of voxels from the lower resolution gird within the semantic layer and compute a weighted sum of the individual distributions (e.g., Gaussian distributions) from each of the voxels within the neighborhood to generate a single higher resolution voxel. In this manner, each higher resolution has fewer voxels than the lower resolution grid and the multi-resolution voxel space may form a multiresolution voxel pyramid.

At 712, the multi-resolution voxel space generation component may smooth a resulting multi-resolution voxel space. For example, the multi-resolution voxel space generation component may convolve the voxels of the multi-resolution voxel space with a Gaussian kernel to reduce noise of the normal estimates of the voxels. In addition, when lidar is used to collect the data representative of the physical environment, the multi-resolution voxel space generation component may remove voxels in corresponding to less than a threshold number of observations (e.g., where a single lidar beam was observed), as these data points may have ill-determined normals and insufficient statistical information.

At 714, the multi-resolution voxel space generation component may reduce voxels having a weight greater than a maximum weight to the maximum weight and remove voxels having a weight below a minimum weight. In some cases, by applying a maximum and minimum weight range to the voxels, the multi-resolution voxel space may maintain a more uniform sample density and prevent voxels close to the system (e.g., autonomous vehicle) from causing disruption to the alignment process discussed below with respect to FIG. 8. In other examples, the multi-resolution voxel space may be stored as a hash of a location of each voxel within a three-dimensional space and then include a lookup table that indexes the hash and provides for quick memory accesses (e.g., using voxel hashing). In this manner, only desired portions of the multi-resolution voxel space may be loaded in memory and accessing the multi-resolution voxel space may be performed using fewer processing resources.

FIG. 8 is another flow diagram illustrating an example process 800 of aligning a target multi-resolution voxel space with a reference multi-resolution voxel space, as described herein. For instance, as discussed above, a multi-resolution voxel space alignment component may utilize the multi-resolution voxel space structure to align multiple scans of a physical environment, such as a target multi-resolution voxel space and a reference multi-resolution voxel space. For instance, once a multi-resolution voxel space (e.g., the target multi-resolution voxel space), is generated for a particular scan or dataset representative of the physical environment, the multi-resolution voxel space alignment component may align the multi-resolution voxel spaces with a multi-resolution voxel space representative of the scene (e.g., the reference multi-resolution voxel space).

At 802, the multi-resolution voxel space alignment component may receive a target multi-resolution voxel space to be aligned with a reference multi-resolution voxel space representing a scene. In some cases, the reference multi-resolution voxel space may be maintained by the system and updated with each new scan of the environment to preform object detection and tracking.

At 804, the multi-resolution voxel space alignment component may determine voxel correspondences between the target multi-resolution voxel space and the reference multi-resolution voxel space. In some examples, the correspondences may be per semantic layer and per resolution. The correspondences may also be determined substantially simultaneously for each resolution of each semantic layer. For instance, at 804, the multi-resolution voxel space alignment component may, for each voxel of a particular resolution in the target multi-resolution voxel space, search the a 2×2×2 neighborhood of voxels containing a mean target point in a corresponding particular resolution of the reference multi-resolution voxel space. The multi-resolution voxel space alignment component may then select a voxel from the 2×2×2 neighborhood that has a centroid closest to the voxel in the target multi-resolution voxel space.

At 806, the multi-resolution voxel space alignment component may reweight the corresponding voxels. For instance, the multi-resolution voxel space alignment component may compute a weighted average of data contained in the two corresponding voxels (e.g., the target voxel and the selected voxel). For instance, a combined covariance may be computed. Once an aggregate covariance is determined, the multi-resolution voxel space alignment component may perform principal component analysis (eigenvalue decomposition, etc.) on the combined covariance matrix of the two corresponding voxels and select the smallest eigenvalue as a matched normal vector. Residuals (or errors) for each voxel may be computed as proportional to the matched normal vector and/or a difference in the mean (or centroid) of the corresponding voxels and an optimization over transformation between the two frames can be performed to minimize such a residual. In this manner during alignment, the coarser resolutions (e.g., resolutions corresponding to larger voxels) may result in matches prior to finer resolutions. In this manner, matches in the coarser resolutions bring the two multi-resolution voxel spaces into a closer alignment, such that the finer resolutions are able to begin matching and complete the alignment process, as discussed above with respect to FIG. 6.

At 808, the multi-resolution voxel space alignment component may determine if a number of iterations has been completed. For example, the system may include a maximum number of iterations of the alignment process to cap or limit the processing time associated with aligning two multi-resolution voxel spaces. If the number of iterations have been completed, the process 800 advances to 812, otherwise the process 800 proceeds to 810.

At 810, the multi-resolution voxel space alignment component may determine if a reweighted average of the combined multi-resolution voxel space is below a tolerance threshold. If the reweighted average is below the tolerance threshold, the process 800 advances to 812, otherwise the process 800 returns to 804. The system may include a tolerance to set a requirement on how well aligned the two multi-resolution voxel spaces should be for a particular usage. For instance, in some applications only a coarse understanding of the physical environment may be required while in others, such as autonomous vehicles more accurate and detailed understand may be required.

At 812, the multi-resolution voxel space alignment component may reduce and/or determine an amount of uncertainty in the alignment of the target multi-resolution voxel space and the reference multi-resolution voxel space. For example, after the optimization (e.g., non-linear optimization above) the multi-resolution voxel space alignment component may propagate measurement noise into the aligned voxels. In one specific example discussed in more detail below, the multi-resolution voxel space alignment component may determine a model the alignment uncertainty according to a Gaussian distribution having a zero mean and zero covariance. For instance, the multi-resolution voxel space alignment component may model a normal random variable $x \sim N(\mu_x, \Sigma_x)$ as each step is computed as follows:

$$x = Cz$$

where $C = (J^T W J)^{-1} J^T W$ (J and W representing the same Jacobian and weights determined and C representing the weighted pseudo-Hamiltonian) and $z \sim N(0, \sigma_z^2 I)$ is the residual.

The covariance of x may then be determined by propagating residual noise and expanding as follows:

$$\Sigma_x = C \Sigma_z C^T$$
$$\Sigma_x = (J^T W J)^{-1} J^T \sigma_z^2 W^2 J (J^T W J)^{-1}$$

In some cases, the residual noise may be computed incrementally and the matrices $J^T W J$ and $\sigma_z^2 J^T W^2 J$ may then be accumulated for each voxel. In one particular example, the multi-resolution voxel space alignment component may also derive an isotropic variance for each residual, $$z_{ij} = \frac{n_{ij}^T}{\sqrt{\lambda_0}}(\mu_i - \mu_j)$$

and the means of each voxel are distributed according to $$\mu_i \sim N\left(0, \frac{\sigma_p^2}{W_i} I\right)$$

where $\sigma_p^2$ is the isotropic Gaussian noise on each point observation and $W_i$ is the weight of the voxel. The residual covariance may then be computed as follows:

$$\sigma_z^2 I = E[zz^T]$$

in which the terms involving $E[\mu_i \mu_j^T]$ are zero due to the assumed independence of the voxel means. Thus:
where $$\sigma_z^2 = \frac{\sigma_p^2}{\lambda_0 W_{match}}$$

$$W_{match} = \frac{W_i W_j}{W_i + W_j}$$

The multi-resolution voxel space alignment component may then further regularize the resulting covariance matrix by adding assumed contributions from some nominal number of outliers and by clamping or limiting a diagonal to a minimum value.

At 814, multi-resolution voxel space alignment component may output the aligned multi-resolution voxel space (which may include the measurement uncertainty). For instance, the aligned multi-resolution voxel space may be provided to another system, such as a planning or perception system of an autonomous vehicle. In other cases, the aligned multi-resolution voxel space may be sent via one or more networks to a remote system or devices, such as a cloud-based computing system. In other examples, the multi-resolution voxel space alignment component may output localization data or transform data between the target multi-resolution voxel space and the reference multi-resolution voxel space associated with a position of the vehicle with regards to the physical environment. In some examples, the reference multi-resolution voxel space may be pre-generated by a cloud-based computing system and sent to the vehicle prior to the vehicle initiating navigation. In some cases, the cloud-based system ma updates the reference multi-resolution voxel space using data (e.g., merge target multi-resolution voxel spaces) collected during operations from multiple vehicles. Further, in some examples, the vehicle may be equipped to update the reference multi-resolution voxel space in an offline manner (such as when parked or otherwise not in active navigation situations).

Figure 9:
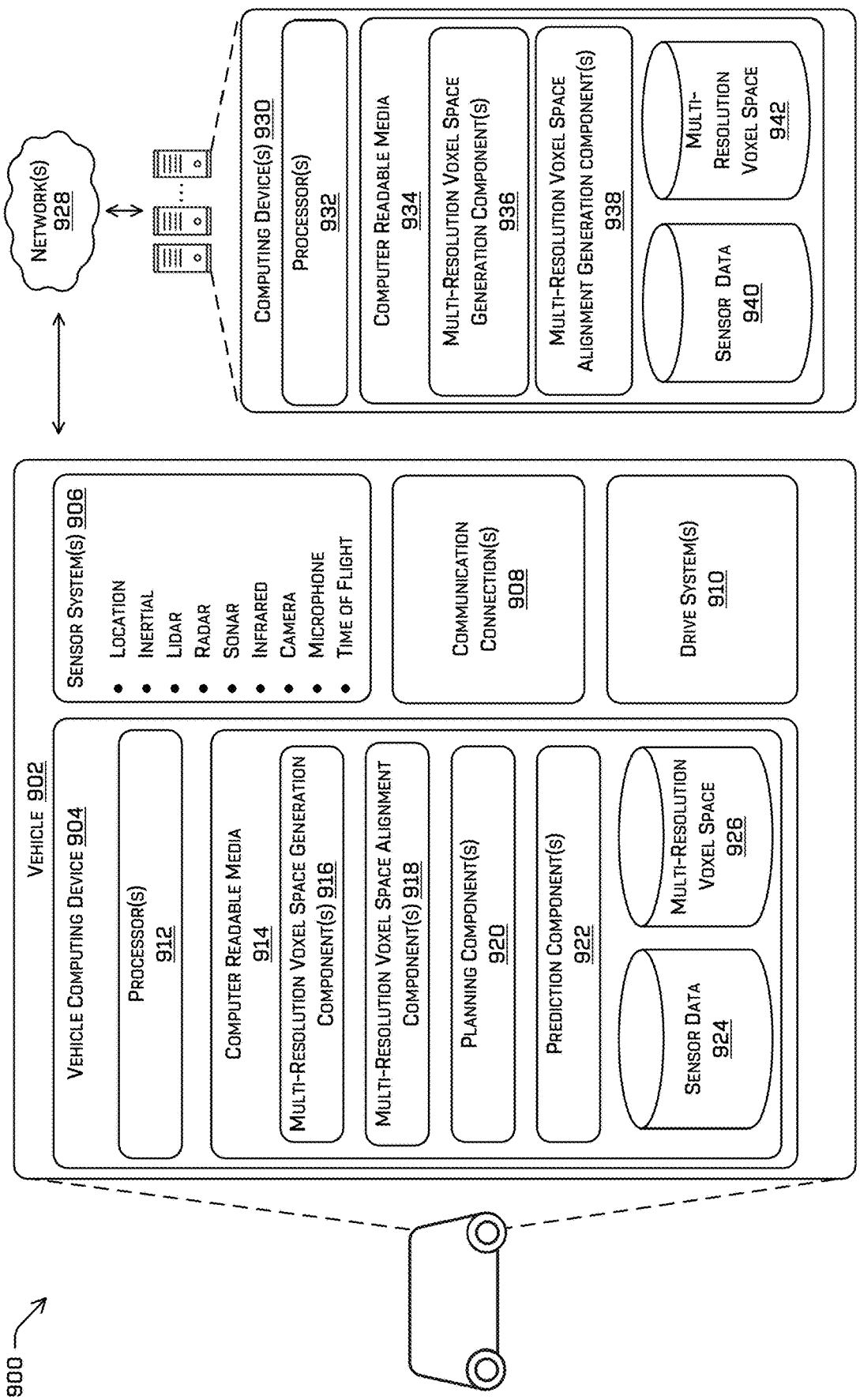
FIG. 9 is a block diagram of an example system for implementing the multi-resolution voxel space alignment system, as described herein.

FIG. 9 illustrates an example system for implementing the techniques described herein, in accordance with embodiments of the disclosure. In some examples, the systems may include one or multiple features, processing resources, components, and/or functionality of embodiments described herein with reference to FIGS. 1-8. As discussed above, in some embodiments, the systems may include autonomous vehicles.

FIG. 9 is a block diagram of an example system 900 for implementing the multi-resolution voxel space alignment system, as described herein. In this embodiment, the system 900 is an autonomous vehicle 902 that may include a vehicle computing device 904, one or more sensor systems 906, one or more communication connections 908, and one or more drive systems 91010.

The vehicle computing device 904 may include one or more processors 912 (or processing resources) and computer readable media 914 communicatively coupled with the one or more processors 912. In the illustrated example, the vehicle 902 is an autonomous vehicle; however, the vehicle 902 could be any other type of vehicle, or any other system (e.g., a robotic system, a camera enabled smartphone, etc.). In the illustrated example, the computer readable media 914 of the vehicle computing device 904 stores multi-resolution voxel space generation components 916, multi-resolution voxel space alignment components 918, planning components 920, perception components 922 as well as other systems associated with an autonomous vehicle. The computer readable media 914 may also store sensor data 924 and multi-resolution voxel spaces 926. In some implementations, it should be understood that the systems as well as data stored on the computer readable media may additionally, or alternatively, be accessible to the vehicle 902 (e.g., stored on, or otherwise accessible by, other computer readable media remote from the vehicle 902).

The multi-resolution voxel space generation components 916 may generate a multi-resolution voxel space from data points representing a physical environment, such as an output of a lidar system. In some cases, the multi-resolution voxel space generation components 916 may receive a plurality of lidar points or a lidar data represented as a point cloud. The multi-resolution voxel space generation components 916 may assign the lidar points to voxels of a voxel grid at a first based resolution. The multi-resolution voxel space generation components 916 may then merge voxels of a lower resolution grid when generating a higher level voxel grid. For example, the multi-resolution voxel space generation components 916 may merge voxels within neighborhood (such as a 2×2×2 neighborhood) in a lower resolution grid when forming the next higher level voxel grid.

In one particular example, multi-resolution voxel space generation components 1016 may generate the multi-resolution voxel space as a mappable contiguous block of memory accessible via a collision-free hash table with pointers implemented as offsets to allow the block to be moved or repositioned within memory. In some cases, the memory block may be represented as a tile having a header, an index (e.g., hash table), and a voxel array. The index may be separated by layers and/or resolutions. The voxel array may include a single array or multiple arrays arranged by resolution (e.g., first semantic layer first resolution grid, second semantic layer first resolution grid, third semantic layer first resolution grid, . . . ). In the voxel array, each element may be a voxel and a key of the spatial position of the voxel. In some cases, the header may include a stack identifier, version number, number of resolutions, number of semantic labels, total number of layers, offsets, etc. The index may be a sparse hash table relating a hash value to an offset within the memory block. The index may also include a salt value which is used to salt the input for this particular table and a prime value which is used in the first round of modulus calculation.

In some examples, the multi-resolution voxel space alignment components 1018 may align two multi-resolution voxel spaces (e.g., a target multi-resolution voxel space and a reference multi-resolution voxel space). In some cases, the multi-resolution voxel space alignment components 918 may find correspondences between voxels of the reference and target multi-resolution voxel space. The multi-resolution voxel space alignment components 918 may find correspondences by, for each voxel of a particular resolution in the target multi-resolution voxel space, searching a three-dimensional (e.g., a 2×2×2, 3×3×3, 5×5×5, etc.) neighborhood of voxels containing a mean target point in a corresponding particular resolution of the reference multi-resolution voxel space. Of the voxels identified within the neighborhood, the multi-resolution voxel space alignment components 918 may select the voxel having a centroid closet to the voxel of the target multi-resolution voxel space. The multi-resolution voxel space alignment components 918 may then average the distributions of the selected voxel in the reference multi-resolution voxel space with the voxel of the target covariance stack. Next, the multi-resolution voxel space alignment components 1018 may perform principal component analysis on the combined covariance matrix and select the smallest eigenvalue as a matched normal vector for the two voxels.

The planning components 920 may determine a path for the vehicle 902 to follow to traverse through the physical environment. For example, the planning components 920 may determine various routes and trajectories and various levels of detail. For example, the planning components 920 may determine a route to travel from a current location to a target location. For the purpose of this discussion, a route may include a sequence of waypoints for travelling between two locations.

In some implementations, the prediction components 922 may be configured to estimate current, and/or predict future, characteristics or states of objects (e.g., vehicles, pedestrians, animals, etc.), such as pose, speed, trajectory, velocity, yaw, yaw rate, roll, roll rate, pitch, pitch rate, position, acceleration, or other characteristics, based at least in part on the multi-resolution voxel spaces 926 output by the multi-resolution voxel space generation components 916 and the multi-resolution voxel space alignment components 918.

The vehicle 902 can also include one or more communication connection(s) 908 that enable communication between the vehicle 902 and one or more other local or remote computing device(s). For instance, the communication connection(s) 908 may facilitate communication with other local computing device(s) on the vehicle 902 and/or the drive system(s) 910. Also, the communication connection(s) 908 may allow the vehicle 902 to communicate with other nearby computing device(s) (e.g., other nearby vehicles, traffic signals, etc.). The communications connection(s) 908 also enables the vehicle 902 to communicate with remote teleoperations computing device or other remote services.

The communications connection(s) 908 may include physical and/or logical interfaces for connecting the vehicle computing device 904 to another computing device (e.g., computing device(s) 930) and/or a network, such as network(s) 928. For example, the communications connection(s) 908 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some examples, the communication connections 908 of the vehicle 902 may transmit or send the multi-resolution voxel spaces 926 to the computing device(s) 930.

In at least one example, the sensor system(s) 906 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 906 can include multiple instances of each of these or other types of sensors. For instance, the lidar sensors may include individual lidar sensors located at the corners, front, back, sides, and/or top of the vehicle 902. As another example, the camera sensors can include multiple cameras disposed at various locations about the exterior and/or interior of the vehicle 902. The sensor system(s) 906 may provide input to the vehicle computing device 904. Additionally, or alternatively, the sensor system(s) 906 can send sensor data, via the one or more networks 928, to the one or more computing device(s) 930 at a particular frequency, after a lapse of a predetermined period of time, in near real-time, etc.

In at least one example, the vehicle 902 can include one or more drive systems 910. In some examples, the vehicle 902 may have a single drive system 910. In at least one example, if the vehicle 902 has multiple drive systems 910, individual drive systems 910 can be positioned on opposite ends of the vehicle 902 (e.g., the front and the rear, etc.). In at least one example, the drive system(s) 910 can include one or more sensor systems 906 to detect conditions of the drive system(s) 910 and/or the surroundings of the vehicle 902, as discussed above. By way of example and not limitation, the sensor system(s) 906 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 910. In some cases, the sensor system(s) 906 on the drive system(s) 910 can overlap or supplement corresponding systems of the vehicle 902.

In at least one example, the components discussed herein can process sensor data 924, as described above, and may send their respective outputs, over the one or more network(s) 928, to one or more computing device(s) 930. In at least one example, the components discussed herein may send their respective outputs to the one or more computing device(s) 930 at a particular frequency, after a lapse of a predetermined period of time, in near real-time, etc.

In some examples, the vehicle 902 can send sensor data to one or more computing device(s) 930 via the network(s) 928. In some examples, the vehicle 902 can send raw sensor data 924 or processed multi-resolution voxel spaces 926 to the computing device(s) 930. In other examples, the vehicle 902 can send processed sensor data 924 and/or representations of sensor data (for instance, the object perception tracks) to the computing device(s) 930. In some examples, the vehicle 902 can send sensor data 924 to the computing device(s) 930 at a particular frequency, after a lapse of a predetermined period of time, in near real-time, etc. In some cases, the vehicle 902 can send sensor data (raw or processed) to the computing device(s) 930.

The computing system(s) 930 may include processor(s) 932 and computer readable media 934 storing multi-resolution voxel space generation components 936, multi-resolution voxel space alignment components 938, as well as sensor data 940 and multi-resolution voxel spaces 942 received from the vehicle 902. In some examples, the multi-resolution voxel space generation components 936 and the multi-resolution voxel space alignment components 938 may be configured to generate multi-resolution voxel spaces 942 or align multi-resolution voxel spaces 942 generated from data captured by multiple vehicles 902 to form more complete scenes of various physical environments and/or connect various scenes together as a signal extended physical environment. In some cases, the multi-resolution voxel space generation components 936 and/or the multi-resolution voxel space alignment components 938 may be configured to generate one or more models from the sensor data 924 that may be used for machine learning and/or future code testing.

The processor(s) 912 of the vehicle 902 and the processor(s) 932 of the computing device(s) 930 may be any suitable processor capable of executing instructions to process data and perform operations as described herein. By way of example and not limitation, the processor(s) 912 and 932 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 914 and 934 are examples of non-transitory computer-readable media. The computer readable media 914 and 934 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 9 is illustrated as a distributed system, in alternative examples, components of the vehicle 902 can be associated with the computing device(s) 930 and/or components of the computing device(s) 930 can be associated with the vehicle 902. That is, the vehicle 902 can perform one or more of the functions associated with the computing device(s) 930, and vice versa.

Figure 10:
FIG. 10 is a pictorial diagram of an example of the multi-resolution voxel space of FIGS. 2-4 in comparison with a point cloud representation of the captured data, as described herein.

FIG. 10 is a pictorial diagram 1000 of an example of the multi-resolution voxel space, such as multi-resolution voxel space 208, of FIGS. 2-4 in comparison with a point cloud representation 1008 of the captured data, as described herein. As illustrated, both the multi-resolution voxel space 208 and the point cloud representation 1008 correspond to a real-world physical location or space.

Example Clauses

A. A system comprising: a lidar sensor; one or more processors; and one or more non-transitory computer readable media storing instructions executable by the one or more processors, wherein the instructions, when executed, cause the system to perform operations comprising: receiving data representative of a physical environment from the lidar sensor; determining a first semantic class associated with a first portion of the data; determining a second semantic class associated with a second portion of the data; associating the first portion of the data with voxels of a first voxel of a first voxel grid, the first voxel grid associated with a first semantic layer of a target multi-resolution voxel space; associating the second portion of the data with voxels of a second voxel of a second voxel grid, the second voxel grid associated with a second semantic layer of the target multi-resolution voxel space, the first voxel grid and the second voxel grid associated with a first resolution; merging a first set of adjacent voxels of the first voxel grid to form a voxel of a third voxel grid associated with the first semantic layer, the third voxel grid associated with a second resolution that is lower than the first resolution; and merging a second set of adjacent voxels of the second voxel grid to form a voxel of a fourth voxel grid associated with the second semantic layer, the fourth voxel grid associated with the second resolution.

B. The system of paragraph A, the operations further comprising: merging a third set of adjacent voxels of the third voxel grid to form a voxel of a fifth voxel grid associated with the first semantic layer, the fifth voxel grid associated with a third resolution that is lower than the second resolution; and merging a fourth set of adjacent voxels of the fourth voxel grid to form a voxel of a sixth voxel grid associated with the second semantic layer, the sixth voxel grid having the third resolution.

C. The system of paragraph A, wherein associating the first portion of the data comprises: determining a number of observations of the first portion of data meets or exceeds a threshold number of observations; determining a mean value of the first portion of data; determining a covariance of the first portion of data; and associating the mean and the covariance with the first voxel.

D. The system of paragraph C, the operations further comprising: receiving a reference multi-resolution voxel space; determining a voxel correspondence between a target voxel of the target multi-resolution voxel space and a reference voxel of the reference multi-resolution voxel space, the target voxel and the reference voxel comprising a same resolution; determining a weighted statistic of a combined voxel representing the target voxel and the reference voxel; determining a transformation between the reference multi-resolution voxel space and the target multi-resolution voxel space based at least in part on the weighted average covariance; and controlling an autonomous vehicle based at least in part on the transformation.

E. A method comprising: receiving sensor data from a sensor; associating at least a first portion of the sensor data with a first voxel of a first voxel grid of a multi-resolution voxel space, the first voxel associated with a first semantic classification and a first resolution; associating at least a second portion of the sensor data with a second voxel of a second voxel grid of the multi-resolution voxel space, the second voxel associated with the first semantic classification and the first resolution; determining, based at least in part on the first voxel and the second voxel, a third voxel associated with a second resolution that is lower than the first resolution, the third voxel associated with the first semantic classification; and controlling an autonomous vehicle based at least in part on the multi-resolution voxel space.

F. The method of paragraph E, further comprising: determining the first semantic classification associated with the first portion of data; determining a second semantic classification associated with a third portion of data; and associating, based at least in part on the second semantic classification, the third portion of the data with a third voxel of the multi-resolution voxel space.

G. The method of paragraph E, wherein associating the first portion of the data comprises: determining a first mean value of the first portion of data; determining a first covariance of the first portion of data; associating the first mean and the first covariance with the first voxel; determining second a mean value of the second portion of data; determining a second covariance of the second portion of data; and associating the second mean and the second covariance with the second voxel.

H. The method of paragraph E, wherein determining the third voxel comprises:

determining a weighted average of the first mean of the first voxel and the second mean of the second voxel; determining a weighted average of the first covariance of the first voxel and the second covariance of the second voxel; and associating the weighted average of the first mean and the second mean and the weighted average of the first covariance and the second covariance with the third voxel.

I. The method of paragraph E, further comprising: receiving a reference multi-resolution voxel space; determining a voxel correspondence between the first voxel and a reference voxel of the reference multi-resolution voxel space, the reference voxel having the first resolution; and determining a weighted statistic of a combined voxel representing the first voxel and the reference voxel; determining a transformation between the multi-resolution voxel space and the reference multi-resolution voxel space based at least in part on the weighted average statistic; and wherein controlling the autonomous vehicle is based at least in part on the transformation.

J. The method of paragraph I, wherein the voxel correspondence is based at least on a distance between a first centroid associated with the reference multi-resolution voxel space and a second centroid associated with the target multi-resolution voxel space.

K. The method of paragraph I, wherein the weighted statistic comprises a weighted covariance.

L. The method of paragraph I, wherein determining the transformation further comprises determining a measurement uncertainty based at least in part on modelling the alignment as a Gaussian distribution.

M. The method of paragraph I, wherein determining the transformation comprises: determining a weighted average of a covariance of the first voxel and a covariance of the reference voxel; and determining a smallest eigenvector of the weighted average.

N. The method of paragraph E, wherein the first voxel and second voxel are adjacent within the first resolution.

O. A non-transitory computer-readable medium storing instructions that, when executed, cause one or more processors to perform operations comprising: receiving sensor data from a sensor associated with a vehicle; associating a first portion of the data with a first voxel of a first grid of a voxel space, the first portion of the data having a first semantic class; determining a first weighted statistic associated with the first portion of the data; associating a second portion of the data with a second voxel of the first grid of the voxel space; determining a second weighted statistic associated with the second portion of the data, the second portion of the data having the first semantic class; determining, based at least in part on the first weighted statistic and the second weighted statistic, a third weighted statistic associated with a third voxel of a second grid of the voxel space, wherein the first grid is associated with a first resolution that that has fewer voxels than a second resolution associated with the second grid; and controlling the vehicle based at least in part on the voxel space.

P. The non-transitory computer-readable medium of paragraph O, the operations further comprising: associating the first portion of the data and the second portion of the data with a first semantic layer of the voxel space, the first semantic layer corresponding to the first semantic class; associating a third portion of the data with a third voxel of the first grid of the voxel space, the third portion of the data having a second semantic class; and associating the third portion of the data with a second semantic layer of the voxel space, the second semantic layer corresponding to the second semantic class.

Q. The non-transitory computer-readable medium of paragraph O, wherein the first semantic class comprises a pedestrian, a vehicle, a building, an animal, or foliage.

R. The non-transitory computer-readable medium of paragraph O, wherein first weighted statistic comprises a first mean and a first covariance of the first portion of the data and the second weighted statistic comprises a second mean and a second covariance of the second portion of the data.

S. The non-transitory computer-readable medium of paragraph O, wherein the third weighted statistic is determined based at least in part on: determining a weighted average of the first mean and the second mean; determining a weighted average of the first covariance and the second covariance; and associating the weighted average of the first mean and the second mean and the weighted average of the first covariance and the second covariance with the third voxel.

T. The non-transitory computer-readable medium of paragraph O, the operations further comprising determining a location of the vehicle within the physical environment based at least in part on the voxel space and a multi-resolution voxel space.

U. A system comprising: one or more processors; and one or more non-transitory computer readable media storing instructions executable by the one or more processors, wherein the instructions, when executed, cause the system to perform operations comprising: receiving data; associating the data with a target multi-resolution voxel space; receiving a reference multi-resolution voxel space; determining a target voxel of the target multi-resolution voxel space associated with a reference voxel of the reference multi-resolution voxel space, the target voxel and the reference voxel associated with a same resolution; and determining a weighted statistical value associated with a combined voxel representing the target voxel and the reference voxel; determining a transformation based at least in part on the weighted statistical value; and controlling an autonomous vehicle based at least in part on the transformation.

V. The system of paragraph U, wherein the weighted statistical value is a weighted covariance matrix.

W. The system of paragraph U, the operations further comprising: performing principal component analysis on the weighted average covariance matrix; and determining a smallest eigenvector of the principal component analysis, wherein determining the transformation is further based on the smallest eigenvector.

X. The system of paragraph U, wherein determining the target voxel of the target multi-resolution voxel space associated with the reference voxel of the reference multi-resolution voxel space and determining the weighted statistical value associated with the combined voxel representing the target voxel and the reference voxel is performed iteratively for multiple pairs of voxels, individual pairs of voxels comprising a voxel of the target multi-resolution voxel space and a voxel of the reference multi-resolution voxel space.

Y. A method comprising: receiving map data comprising a first voxel space, the first voxel space having a first layer associated with a first resolution and a second layer associated with a second resolution different than the first resolution; receiving sensor data from a sensor associated with a vehicle; associating the sensor data with a second voxel space, the second voxel space comprising a first layer associated with the first resolution and a second layer associated with the second resolution; determining, based at least in part on the first voxel space and the second voxel space, first aggregated voxel data; determining, based at least in part on the first aggregated voxel data, a transformation between the first voxel space and the second voxel space; and determining a location of the vehicle in the physical environment based at least in part on the transformation.

Z. The method of paragraph Y, wherein determining the first aggregated voxel data comprises: identifying, for a first voxel of the first voxel space, a set of voxels of the second voxel space that have a centroid within a specified distance of a centroid of the first voxel; selecting a second voxel of the set of voxels, the second voxel having a centroid nearest to the centroid of the first voxel; and determining a weighted average of a covariance of the first voxel and a covariance of the reference voxel.

AA. The method of paragraph Z, wherein the first voxel and the second voxel comprise a same semantic class.

AB. The method of paragraph Z, wherein determining the first aggregated voxel data further comprises: determining a smallest eigenvector of the weighted average; and determining a normal vector representative of the first aggregated voxel data based at least in part on the smallest eigenvector.

AC. The method of paragraph AB, wherein reweighting the first aggregated voxel data comprises applying an m-estimator framework.

AD. The method of paragraph AB, wherein determining the transformation comprises: determining, based at least in part on the smallest eigenvalue, a residual; and determining one or more of a rotation or a translation between the target voxel space and reference voxel space based at least in part on the residual.

AE. The method of paragraph AD, further comprising determining an uncertainty associated with the alignment based at least in part on modeling a distribution.

AF. The method of paragraph Z, the transformation is indicative of a difference in one or more of a position or orientation between the first voxel space and second voxel space.

AG. The method of paragraph Z, wherein the vehicle is an autonomous vehicle, the method further comprising: controlling the autonomous vehicle based at least in part on the location of the autonomous vehicle in the physical environment.

AH. non-transitory computer-readable medium storing instructions that, when executed, cause one or more processors to perform operations comprising: receiving a target multi-resolution voxel space; receiving a reference multi-resolution voxel space; determining a first target voxel of the target multi-resolution voxel space is associated with a first reference voxel of the reference multi-resolution voxel space, the first target voxel and the first reference voxel sharing a first resolution; determining a first weighted statistic of the first target voxel and the first reference voxel; determining a second target voxel of the target multi-resolution voxel space is associated with a second reference voxel of the reference multi-resolution voxel space, the second target voxel and the second reference voxel sharing a second resolution, the second resolution different than the first resolution; determining a second weighted statistic of a second combined voxel representing the second target voxel and the second reference voxel; and determining a transformation between the target and reference multi-resolution voxel spaces based at least in part on the first weighted statistic and the second weighted statistic.

AI. The non-transitory computer-readable medium of paragraph AH, wherein the target multi-resolution voxel space comprises a first set of voxels associated with a first classification and a second set of voxels associated with a second classification.

AJ. The non-transitory computer-readable medium of paragraph AH, wherein determining the first target voxel of the target multi-resolution voxel space is associated with the first reference voxel of the reference multi-resolution voxel space comprises: identifying for a first target voxel, a set of voxels of the reference multi-resolution voxel space that have a centroid within a specified distance of a centroid of the first target voxel; and determining the first reference voxel from the set of voxels based on a distance of a centroid of the first reference voxel to the centroid of the first target voxel.

AK. The non-transitory computer-readable medium of paragraph AH, further comprising determining the first target voxel and the first reference voxel correspond based at least in part on a distance of a centroid of the first target voxel and a centroid of the first reference voxel.

AL. The non-transitory computer-readable medium of paragraph AH, wherein the first weighted statistic is a weighted average covariance.

AM. The non-transitory computer-readable medium of paragraph AH, wherein determining the transformation comprises: performing principal component analysis on the first weighted statistic; determining a smallest eigenvalue of the principal component analysis; determining, based at least in part on the smallest eigenvalue, a residual; and determining, as the transformation, one or more of a rotation or translation between the target and reference multi-resolution maps that optimizes the residual.

AN. The non-transitory computer-readable medium of paragraph AM, further comprising applying one or more of a gradient descent or non-linear optimization technique to minimize a value based at least in part on the residual, wherein the transformation comprises one or more of a translation or a rotation.

While the example clauses described above are described with respect to one particular implementation, it should be understood that, in the context of this document, the content of the example clauses can also be implemented via a method, device, system, a computer-readable medium, and/or another implementation. Additionally, any of examples A-AN may be implemented alone or in combination with any other one or more of the examples A-AN.

Conclusion

As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 9 may utilize the processes and flows of FIGS. 1-8.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
one or more processors; and
one or more non-transitory computer readable media storing instructions executable by the one or more processors, wherein the instructions, when executed, cause the system to perform operations comprising:
receiving data comprising a plurality of data points;
associating the data with a target multi-resolution voxel space comprising a first target layer associated with a first resolution and a second target layer associated with a second resolution different than the first resolution, wherein a voxel of the target multi-resolution voxel space comprises a subset of the plurality of data points;
receiving a reference multi-resolution voxel space comprising a first reference layer associated with the first resolution and a second reference layer associated with the second resolution;
determining a target voxel of the target multi-resolution voxel space associated with a reference voxel of the reference multi-resolution voxel space, the target voxel and the reference voxel associated with a same resolution; and
determining a statistical value associated with a combined voxel representing the target voxel and the reference voxel, wherein the statistical value comprises a weighted covariance matrix determined based at least in part on a number of points of the target voxel and the reference voxel;
determining a transformation based at least in part on the statistical value; and
controlling an autonomous vehicle based at least in part on the transformation.

2. The system of claim 1, the operations further comprising:
performing principal component analysis on the weighted covariance matrix; and
determining a smallest eigenvector of the principal component analysis, wherein determining the transformation is further based on the smallest eigenvector.

3. The system of claim 1, wherein determining the target voxel of the target multi-resolution voxel space associated with the reference voxel of the reference multi-resolution voxel space and determining the statistical value associated with the combined voxel representing the target voxel and the reference voxel is performed iteratively for multiple pairs of voxels, individual pairs of voxels comprising a voxel of the target multi-resolution voxel space and a voxel of the reference multi-resolution voxel space.

4. A method comprising:
receiving map data comprising a first voxel space, the first voxel space having a first layer associated with a first resolution and a second layer associated with a second resolution different than the first resolution;
receiving sensor data comprising a plurality of data points from a sensor associated with a vehicle;
associating the sensor data with a second voxel space, the second voxel space comprising a first layer associated with the first resolution and a second layer associated with the second resolution, wherein a voxel of the second voxel space comprises a subset of the plurality of the data points;
determining, based at least in part on the first voxel space and the second voxel space, a first aggregated voxel data, wherein the first aggregated voxel data comprises a weighted covariance matrix associated with the voxel;
determining, based at least in part on the first aggregated voxel data, a transformation between the first voxel space and the second voxel space; and
determining a location of the vehicle in an environment based at least in part on the transformation.

5. The method of claim 4, wherein determining the first aggregated voxel data comprises:
identifying, for a first voxel of the first voxel space, a set of voxels of the second voxel space that have a centroid within a specified distance of a centroid of the first voxel;
selecting a second voxel of the set of voxels, the second voxel having a centroid nearest to the centroid of the first voxel; and
determining a weighted average of a covariance associated with the first voxel and a covariance associated with the second voxel of the set of voxels.

6. The method of claim 5, wherein the first voxel and the second voxel comprise a same semantic class.

7. The method of claim 5, wherein determining the first aggregated voxel data further comprises:
determining a smallest eigenvector of the weighted average; and
determining a normal vector representative of the first aggregated voxel data based at least in part on the smallest eigenvector.

8. The method of claim 7, wherein determining the transformation comprises:
determining, based at least in part on the smallest eigenvector, a residual; and
determining one or more of a rotation or a translation between the first voxel space and the second voxel space based at least in part on the residual.

9. The method of claim 8, further comprising determining an uncertainty associated with the transformation based at least in part on modeling a distribution.

10. The method of claim 4, wherein determining the first aggregated voxel data comprises applying an m-estimator framework.

11. The method of claim 4, wherein the transformation is indicative of a difference in one or more of a position or orientation between the first voxel space and second voxel space.

12. The method of claim 4, wherein the vehicle is an autonomous vehicle, the method further comprising:
controlling the autonomous vehicle based at least in part on the location of the autonomous vehicle in the environment.

13. The method of claim 4, further comprising:
performing principal component analysis on the weighted covariance matrix; and
determining a smallest eigenvector of the principal component analysis, wherein determining the transformation is further based on the smallest eigenvector.

14. One or more non-transitory computer-readable media storing instructions that, when executed, cause one or more processors to perform operations comprising:
receiving a target multi-resolution voxel space comprising a first target layer associated with a first resolution and a second target layer associated with a second resolution different than the first resolution;
receiving a reference multi-resolution voxel space comprising a first reference layer associated with the first resolution and a second reference layer associated with the second resolution;
determining that a first target voxel of the target multi-resolution voxel space is associated with a first reference voxel of the reference multi-resolution voxel space, the first target voxel and the first reference voxel sharing the first resolution;
determining a first weighted statistic of the first target voxel and the first reference voxel;
determining that a second target voxel of the target multi-resolution voxel space is associated with a second reference voxel of the reference multi-resolution voxel space target voxel and the second reference voxel sharing the second resolution, the second;
determining a second weighted statistic of a second combined voxel representing the second target voxel and the second reference voxel; and
determining a transformation between the target and reference multi-resolution voxel spaces based at least in part on the first weighted statistic and the second weighted statistic.

15. The one or more non-transitory computer-readable media of claim 14, wherein the target multi-resolution voxel space comprises a first set of voxels associated with a first classification and a second set of voxels associated with a second classification.

16. The one or more non-transitory computer-readable media of claim 14, wherein determining the first target voxel of the target multi-resolution voxel space is associated with the first reference voxel of the reference multi-resolution voxel space comprises:
identifying for a first target voxel, a set of voxels of the reference multi-resolution voxel space that have a centroid within a specified distance of a centroid of the first target voxel; and
determining the first reference voxel from the set of voxels based on a distance of a centroid of the first reference voxel to the centroid of the first target voxel.

17. The one or more non-transitory computer-readable media of claim 14, further comprising determining that the first target voxel and the first reference voxel correspond based at least in part on a distance of a centroid of the first target voxel and a centroid of the first reference voxel.

18. The one or more non-transitory computer-readable media of claim 14, wherein determining the transformation comprises:
performing principal component analysis on the first weighted statistic;
determining a smallest eigenvalue of the principal component analysis;
determining, based at least in part on the smallest eigenvalue, a residual; and
determining, as the transformation, one or more of a rotation or translation between the target multi-resolution voxel space and the reference multi-resolution voxel space that optimizes the residual.

19. The one or more non-transitory computer-readable media of claim 18, the operations further comprising applying one or more of a gradient descent or non-linear optimization technique to minimize a value based at least in part on the residual, wherein the transformation comprises one or more of a translation or a rotation.

20. The one or more non-transitory computer-readable media of claim 14, wherein determining the first target voxel of the target multi-resolution voxel space associated with the first reference voxel of the reference multi-resolution voxel space and determining the first weighted statistic associated with of the first target voxel and the first reference voxel is performed iteratively for multiple pairs of voxels.

* * * * *